Patented Aug. 19, 1941

2,252,702

UNITED STATES PATENT OFFICE 2,252,702

INK AND METHOD OF MANUFACTURING THE SAME

Joseph G. Curado, Rutherford, N. J., assignor to General Printing Ink Corporation, New York, N. Y., a corporation of Delaware No Drawing. Application December 21, 1938, Serial No. 246,993

14 Claims. (Cl. 134—35)

This invention relates to pigments such as are used for inks and more particularly to pigments such as are commonly referred to as "flushed," and to products made therefrom.

A principal object of the invention is to produce a flushed pigment in which a much higher proportion of water is eliminated than has heretofore been possible, and to accomplish this separation with a decided saving in time over prior art processes.

A further object is to produce directly, a flushed pulp which is stable with respect to driers when stored for appreciable lengths of time.

Still another object is to provide a method for producing such a flushed pigment material.

Other objects and advantages will be apparent from the description below, which sets out a preferred embodiment of the invention and the method of practicing it and from the appended claims.

Most pigments, especially the organic pigments, lakes, etc., are prepared by chemical means, and for the most part are formed in water suspensions and in a very fine state of subdivision.

It has been the practice in the past to dry and grind the pigment before use, and this drying has resulted in the formation of hard lumps and agglomerates which could only be broken down by long and costly grinding in the desired vehicle.

Recently processes have been developed for utilizing pigments in their original fine state of subdivision which involve transferring the pulp directly from the watery to non-aqueous vehicles without intermediate drying. In an effort to improve, and speed up these so-called "flushing" processes, agitation has been resorted to, as well as the use of additive materials to facilitate the transfer of pigment to oil, with attendant separation of a portion of the water.

These practices, while producing colors of greatly improved dispersion, are costly and time consuming. In fact in regular commercial practice the time required to "flush" a batch of pigment varies between about 45 minutes for the most easily flushed colors to about 3 hours for the more difficult ones. Moreover, in previous flushing procedures only about 55 to 80% of the water in the pulps could be eliminated in the flushing operation.

After further removal of moisture by heat and vacuum, most flushed colors, particularly in cases where zinc or other metallic naphthenates have been used as flushing agents, exhibited very poor "drier stability" when stored in the presence of added driers. For example, although when inks of this type were freshly prepared, using any of the well known paint drier materials, they behaved in a normal fashion and dried in the normally expected time, nevertheless, after these same inks had been stored for several weeks, the drying capacity of the inks was considerably reduced, and they were said to have suffered "drier absorption" whereby the effect of the drier had been destroyed in some unexplained manner.

I have now found that by treating any of the commonly used pigments in slurry or press cake form with a small controlled quantity of lecithin suspension, the time of flushing can be reduced so as to require only from 5–30 minutes, for even the most difficult pigments. Furthermore, the percentage of water eliminated by my process ranges from 75 to 98% of the water originally present in the pulp. Moreover, after evaporation of the remaining moisture to a point comparable to that present in dry ground colors, and the addition of driers, the composition was found to be capable of storage for indefinite periods without the slightest tendency to "drier absorption" or reduction of drying efficiency of the product.

In carrying out my invention, I place the wet pigment pulp containing from 50 to 85% of water in a suitable vessel such as a Werner-Pfleiderer mixer. The lecithin suspension is then added and the mass thoroughly agitated. The oil or other suitable vehicle is added and agitation continued—or the oil may be added before the lecithin—although in most cases where the pulp is used this sequence offers no particular advantage. In from 5 to 30 minutes 75 to 98% of the water present will separate or flush out and can be decanted. The proportion of water flushed varies with the pigment under treatment. Pigments of the types of alumina hydrate, peacock blue, and tartrazine yellow flush about 75% of water by this method while those of the milori blue, para red, and phloxine red types flush about 98%. In previous flushing procedures these figures varied between about 55% for the first 3 types of pigments and about 80% for the last 3. This more nearly complete flushing of the water by my invention is a distinct advantage over the prior art, not only in improving speed and completeness of flushing, but further in removing a higher percentage of the by-product salts present in the liquor, thereby lowering the content of undesirable crystalline impurities in the product. In cases where a substantially water-free product is required, drying time is greatly reduced, as there is less residual water to be evaporated.

In preparing compositions such as printing inks, I may add metallic driers in proportions up to about 10% except in cases where the pigment is itself a metallic compound having drying properties such as the iron blues.

Although in general the treatment will be given to filtered or concentrated pulps, in some cases it may be advantageous to conduct the "flushing" directly upon the "tank slurry" containing from 2.5 to 15% of pigment in water. This can readily be done if the vessel is equipped for efficient agitation. The filtering operation may thus be avoided, but in the case of the "acid" pigments described above, greater quantities of reagents will be required to neutralize the charge. Where saving of time is very important such a procedure is often desirable.

The lecithin used is any one of a group of substances known as monoamino monophosphatids, which have the general composition:

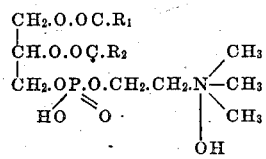

where .OC.R₁ and .OC.R₂ are fatty acid radicals.

For my purposes it is most conveniently used in suspension and may be suspended by any of a number of suitable wetting agents such as the common sulfonated higher alcohols. I found it convenient to use a dispersion of vegetable lecithin in soya bean oil containing about 70% lecithin to 30% soya bean oil. A suitable suspension may be prepared by boiling 16.7 grams of the dispersion and 3.3 grams of a sulfonated lauryl or decyl alcohol in 1000 cc. of water.

About ½% to 5% of the lecithin suspension based on the dry weight of the pigment has been found satisfactory to completely flush most pigments.

Most pigments can be mixed directly with lecithin suspension, as described above, but some pigments, notably those precipitated under acid conditions such as the iron blues, work more satisfactorily if they are given a pretreatment to adjust their pH and to alter their surface characteristics so that they are more receptive to the action of the lecithin. This pretreatment consists in general of washing to remove a part of the acid, then partially neutralizing the free acid present with a hydroxide of an amphoteric metal such as zinc or aluminum hydroxide either alone or mixed with other alkali to bring the pH to between 5 and 6 in the case of iron blue. To the nearly neutral suspension is added an alkali salt of naphthenic or other cycloparaffinic acid, which causes the metallic salt, for example, zinc naphthenate, to be precipitated on the pigment particles. The pulp is now ready for the treatment described above.

Other acid pigment such as peacock blue, phloxine red and tartrazine yellow can be adjusted to a pH of slightly above 4 by the addition of zinc hydroxide before the addition of lecithin but because these colors begin to dissolve at pH values above about 4, such neutralization should not be carried higher. This is not necessary, however, as rapid and substantially complete flushing can be obtained with lecithin suspensions even at ranges below 4, and without the addition of any neutralizing agents whatsoever.

Specific examples of satisfactory practicing of my invention are given below:

1. Chrome yellow

To 300 pounds of chrome yellow slurry containing 64 pounds of pigment in a vessel equipped with a high speed agitator 18¾ pounds 00 litho varnish and 18¾ pounds of #1 litho varnish were added and violently agitated. To this mixture was added 12 ounces of lecithin suspension consisting of a mixture of about 70% lecithin and 30% soya bean oil, suspended in 4 pounds of a ½% solution of sulfonated decyl alcohol. In from 2 to 5 minutes after this addition the strongly flocculated mass of oil and pigment was allowed to settle out. This required only about 5 minutes. The supernatant liquor was decanted and agitation resumed. In about 1 to 2 minutes a soft coherent mass of pigment and oil formed. The clear water that separated was then decanted. About 10% water remained in the resulting paste which was transferred to a heated vacuum mixer where the small amount of water remaining was evaporated. The total time consumed in making this batch exclusive of settling and drying time was about 8 minutes. In a mixer in which continuous dewatering means are available the decanting time would be nearly eliminated or at least substantially reduced.

2. Iron blue

To 288 pounds of iron blue filter press cake containing 96 pounds of pigment and having a pH of 3.8 was added 7 pounds of freshly precipitated zinc hydroxide. This mixture was worked in a dough mixer for five minutes. This raised the pH to 5.5. Five pounds of sodium naphthenate were then added in the form of a 25% solution in water. After this had been thoroughly mixed, 2.3 pounds lecithin-oil mixture were added in the form of a 15% suspension in water, made by boiling and stirring the lecithin-oil mixture in a ½% water solution of sulfonated decyl alcohol. Following the addition of the lecithin suspension 78 pounds of 00 litho varnish were poured into the mixing mass. Around 98% of the water present in the press cake separated and was decanted. The smooth oil-pigment paste remaining contained about 6% of water which was removed by heat and vacuum. The total time consumed in the combined treatment and flushing of this batch was about 20 minutes.

3. Alumina hydrate

Forty pounds of alumina hydrate pulp containing eight pounds of pigment were agitated in a Werner & Pfleiderer mixer, with 3 ounces of lecithin suspended in 17 ounces of a ½% solution of a sulfonated decyl alcohol. Then 8¾ pounds of 0 linseed varnish were poured into the mixing mass. Within ½ hour 80% of the water present flushed out and was decanted. The balance of the water was then evaporated by heat and vacuum.

A portion of this paste was made into a transparent ink by the addition of about 4% cobalt paste drier and when printed showed satisfactory drying qualities. A portion of the ink was packaged and stored for 7 weeks when another printing trial was made. The drying properties of the ink were unchanged whereas a similar ink made about the same time using the same percentage of drier but in which zinc naphthenate had been used as the flushing agent lost its drying properties in less than a month and behaved like an ink to which no drier had been added.

The oil-pigment mixtures resulting from my process are of a heavy consistency and may be thinned with the usual additional ingredients such as oils, solvents, diluents and the like to reduce them to the proper consistency for use in inks, paints, and other coating compositions.

When driers are added, as is customary in making up and packaging inks, the finished products can be stored indefinitely without any appreciable reduction or diminution in drier efficiency from that originally possessed, and in this respect are comparable to the best "dry color" inks.

While the process and product herein described constitute preferred embodiments of the invention, it is to be understood that the invention is not limited to this precise process and product, and that changes may be made therein without departing from the scope of the invention which is defined in the appended claims.

What is claimed is:

1. The method, of the character described, of transferring a water wet pigment paste from a wet pulp directly to an oily vehicle without intermediate drying which comprises adding a small amount of lecithin to the pulp, adding oily vehicle thereto, and agitating until substantially all of the water separates.

2. The method, of the character described, of transferring a water wet pigment paste from a wet pulp directly to an oily vehicle without intermediate drying which comprises adding between ½–5% of lecithin based on the dry weight of the pigment, adding oily vehicle thereto and agitating until between 75% and 98% of the water separates.

3. The method, of the character described, of transferring a water wet pigment paste from a wet pulp directly to an oily vehicle without intermediate drying which comprises washing the pigment to raise the pH to 4–5, neutralizing part of the remaining acidity with an alkaline material containing a hydroxide of an amphoteric metal, adding oily vehicle and a controlled small proportion of lecithin suspension of approximately not more than 5% of lecithin based on the dry weight of the pigment and agitating until oil and pigment jointly separate from the substantially major portion of the water.

4. The method, of the character described, of preparing a printing ink from a flushed pulp produced from a water wet pigment material, which comprises adding a small quantity of a lecithin suspension of approximately not more than 5% of lecithin based on the dry weight of the pigment to the pigment filter press cake, agitating the mixture in the presence of an oily vehicle to flush the pigment into the oil, with removal of a substantially major portion of the water present in the pigment filter press cake, removing additional water by heat and vacuum, and adding metallic drier thereto, whereby a prolonged drier stability comparable to inks of similar printing characteristics but prepared from dry ground colors is attained.

5. A printing ink, of the character described, comprising as an essential ingredient a flushed pigment material produced according to the method described and exhibiting prolonged drier stability, said pigment material comprising a pigment suspended in an oily vehicle, and containing between 5–20% water on the dry weight of the pigment, a small percentage of lecithin of approximately not more than 5% on the dry weight of the pigment and up to about 10% of a metallic drier.

6. As an intermediate product of manufacture, a pigment material produced according to the method described and comprising a pigment suspended in an oily vehicle and flushed by the intimate admixture of a controlled small amount of lecithin and containing a quantity of water retained after flushing within the range of 5–20% on the dry weight of the pigment and containing before admixture into an ink, or the like, a percentage of lecithin of the order of ½–5%, and adapted on admixture with a metallic drier substantially to retain its drier efficacy substantially undiminished for prolonged periods in excess of seven weeks.

7. The method, of the character described, of transferring a water wet pigment paste from a wet pulp directly to an oily vehicle without intermediate drying which comprises adding a small amount of lecithin of approximately not more than 5% based on the dry weight of the pigment to the pulp, adding an oily vehicle thereto, and agitating with concomitant water separation until substantial completion of the water separation to produce a flushed pigment containing a quantity of retained water within the range of 2–25% of the water in said wet pulp.

8. A method of the character described of transferring a water-wet iron blue pigment pulp directly to an oily vehicle without intermediate drying which comprises washing the pigment to raise the pH to 4–5, neutralizing a part of the remaining acidity with an alkaline material containing a hydroxide of an amphoteric metal to bring the pH to 5–6, adding an alkali salt of a naphthenic acid to precipitate the metallic salt of the acid upon the pigment particles, adding oily vehicle and a controlled small proportion of lecithin suspension and agitating until oil and pigment jointly separate from the substantially major portion of the water.

9. A printing ink of the character described comprising as an essential ingredient a pigment material flushed with lecithin and containing a metallic drier and exhibiting a prolonged drier stability of at least six weeks, said flushed pigment material comprising a pigment suspended in an oily vehicle, a controlled small quantity of lecithin of approximately not more than 5%, and containing from 5 to 20% of the water on the dry weight of the pigment, and up to approximately 10% of the metallic drier.

10. A printing ink of the character described, comprising as an essential ingredient an iron blue pigment material flushed with lecithin and containing a metallic drier and exhibiting a drier stability of not less than approximately six weeks, said flushed pigment material comprising the pigment suspended in an oily vehicle, and a controlled small quantity of lecithin of approximately not more than 5% and containing from 5 to 20% water on the dry weight of the pigment, and up to approximately 10% of the metallic drier.

11. The method of the character described of eliminating about 75% of the water from water wet pigments of the type of alumina hydrate, peacock blue and tartrazine yellow, and substituting oil therefor, which comprises adding a small amount of lecithin of approximately 5% based on the dry weight of pigment in the pulp, adding an oil thereto and agitating until separation of water occurs to produce a flushed pigment containing a quantity of retained water of about 25% of the water in said wet pulp.

12. The method of the character described of eliminating about 98% of the water from water wet pigments of the type of milori blue, para red and phloxine red having initial acidities in the neighborhood of pH 3 to 4, and substituting oil therefor, which comprises neutralizing a portion of the acidity with an alkaline material containing a hydroxide of an amphoteric metal, adding a small amount of lecithin of approximately 5% based on the dry weight of pigment in the pulp, adding oily vehicle thereto, and agitating until oil and pigment jointly separate to produce a flushed pigment containing a quantity of retained water approximating about 2% of the water in said wet pulp.

13. As an intermediate product of manufacture a flushed pigment material comprising a pigment of the type of alumina hydrate, peacock blue and tartrazine yellow, suspended in an oily vehicle, and flushed by the intimate admixture of a controlled small amount of lecithin, and containing a quantity of water retained after flushing of about 5% based on the dry weight of the pigment, and adapted on admixture with metallic drier substantially to retain its drier efficiency substantially undiminished for prolonged periods in excess of seven weeks.

14. As an intermediate product of manufacture, a flushed pigment material comprising a pigment c" the type of iron blue, para red and phloxine red, suspended in an oily vehicle and flushed by the intimate admixture of a controlled small amount of lecithin, and containing a quantity of water retained after flushing of about 2% based on the dry weight of the pigment and adapted on admixture with metallic drier substantially to retain its drier efficiency substantially undiminished for prolonged periods in excess of seven weeks.

JOSEPH G. CURADO.